Figure 1:
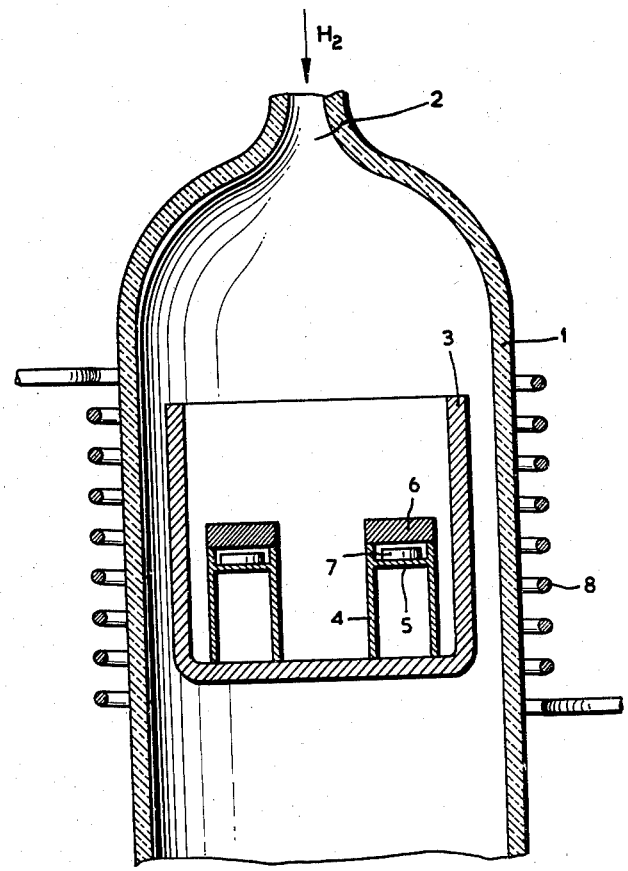

Feb. 14, 1961  A. VENEMA ET AL  2,971,246
METHOD OF PRODUCING CAVITY-TYPE DISPENSER CATHODE
Filed Dec. 31, 1957  2 Sheets-Sheet 1

INVENTOR
ALBERTUS VENEMA
CORNELIS ARNOLDUS MARIA
VAN DEN BROEK
BY
AGENT

United States Patent Office 2,971,246
Patented Feb. 14, 1961

2,971,246

METHOD OF PRODUCING CAVITY-TYPE DISPENSER CATHODE

Albertus Venema and Cornelis Arnoldus Maria van den Broek, Eindhoven, Netherlands, assignors to North American Philips Company, Inc., New York, N.Y., a corporation of Delaware Filed Dec. 31, 1957, Ser. No. 706,420

Claims priority, application Netherlands Jan. 26, 1957

2 Claims. (Cl. 29—25.14)

This invention relates to methods of producing cathodes which are provided with a supply chamber in the form of a moybdenum member, which chamber is closed at the side of the cathode intended for emission by a porous tungsten member which is sintered at a high temperature, a mixture of barium aluminate and powdered tungsten being provided in the chamber.

In cathodes in which the supply is provided behind a fabric of molybdenum or tungsten wire or behind a number of tungsten rings which are pressed together, it is known to add tungsten to the barium oxide supply in order to accelerate the production of free barium. In view of the heater filament provided in the supply chamber, in some cases aluminum oxide is added in order to reduce the electrical conductivity.

In cathodes, in which the emissive surfaces comprise a number of radially disposed vanes surrounding a sleeve of fine metal wire containing a supply of barium compounds, it is also known for these compounds to consist of barium aluminate and tungsten.

In dispenser-type cathodes in which the emissive surface consists of porous tungsten, a mixture of aluminates and tungsten has also been used.

An advantage of cathodes which behind the porous tungsten member contain a supply of barium aluminate and powdered tungsten, consists in that in operation the barium evaporation, which may be in the form of barium oxide, is slight. However, they have a limitation in that there may occur comparatively large differences in the emission, while after closure of the supply chamber and mounting of a cathode in a tube, the activation time required for achieving operative emission is comparatively long.

Cathodes are also known which are produced by impregnating a porous tungsten member with barium aluminate, and these cathodes have the advantage of a small activation time; however, initially the evaporation exceeds that in a cathode provided with a supply chamber.

It is an object of the present invention to provide a method of producing cathodes provided with a supply chamber, by which cathodes are obtained which have a short activation time, slight evaporation and small relative differences in the emission.

According to the invention, in a method of producing a cathode provided with a supply chamber in the form of a molybdenum member, which chamber at the cathode side intended for emission is closed by a porous tungsten member sintered at a high temperature, a compressed mixture of barium aluminate and powdered tungsten being provided in the supply chamber, the cathode is heated after the closure of the supply chamber to a temperature of from 1900° K. to 2200° K. in a hydrogen atmosphere for a short period of time, after which the assembly is rapidly cooled.

When a cathode thus treated is mounted in an evacuated tube, it provides a constant high emission within a short period of time, the barium evaporation being slight. This evaporation is less than one tenth of that of a cathode the supply chamber of which is filled with barium-strontium oxide. The activation time may be reduced from 200 hours to about 15 hours as compared with known cathodes.

With a view to a simple arrangement and a short heating period, use is preferably made of hydrogen under a pressure of 1 atm., the heating time being of the order of one minute in accordance with the temperature chosen. If the use of pure hydrogen would entail too great a danger of explosions, the hydrogen may be diluted with a noble gas, such as for instance argon. Preferably, use is made of barium aluminate produced in or reheated in a hydrogen atmosphere. Thus, occlusions of oxygen and, as the case may be, of carbon dioxide or monoxide may be avoided.

Heating the entire cathode in hydrogen at a high temperature would appear to result in the production of an amount of free barium which is absorbed in the pores of the porous tungsten member, any impurities present in the tungsten or any excess oxygen being also removed by the hydrogen. The high pressure of the hydrogen prevents the barium from evaporating at too high a rate. To limit this evaporation the heating time should not exceed that indicated above.

Heating must be carried out in a manner such that melting of the aluminate-tungsten mixture does not give rise to the absorption of aluminate into the porous tungsten member; if the mixture is provided on the bottom of the molybdenum supply chamber, this absorption is unlikely. The likelihood of absorption is very small with the mixtures used. Absorption results in the production of an impregnated cathode having a higher rate of evaporation. The cooling down after heating is done as quickly as possible to avoid undesired evaporation or reactions. The mass of the heated assembly should be therefore very small.

Figure 2:
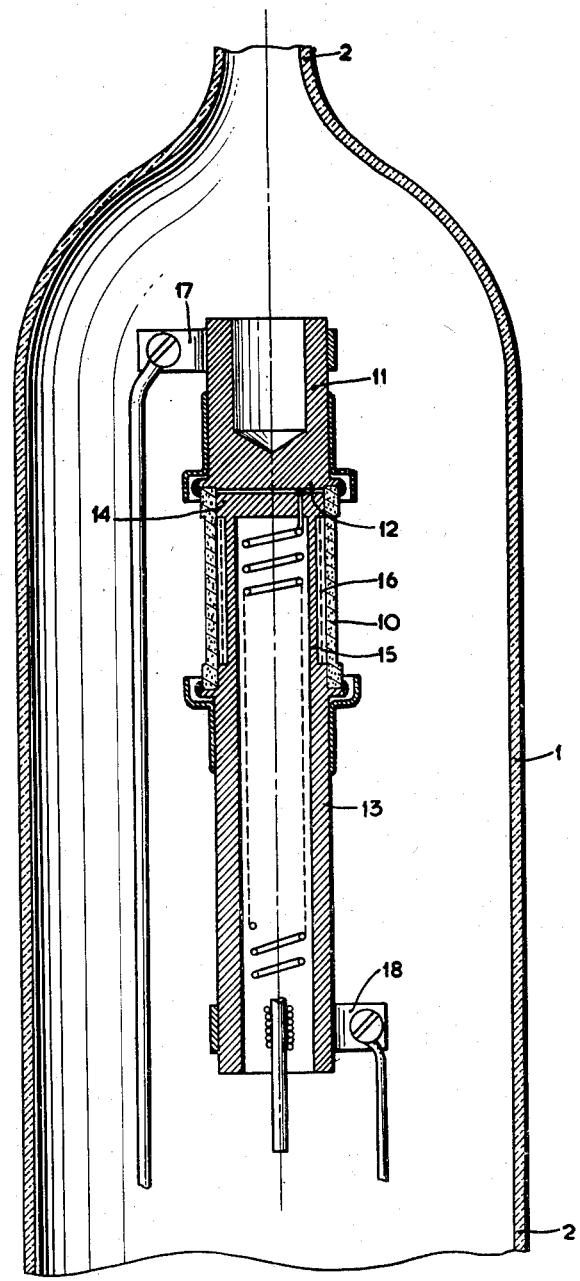

In order that the invention may readily be carried out, two embodiments thereof will now be described in the accompanying diagrammatic drawings, in which:

Figures 1 and 2 show arrangements for heating completely assembled cathodes having a flat and a cylindrical porous member respectively.

In Fig. 1, reference numeral 1 denotes a quartz tube into which hydrogen under a pressure of 1 atm. is introduced through an opening 2. In the tube, there is arranged a molybdenum crucible 3 containing two cathodes. Each cathode consists of a cylindrical molybdenum member 4 having a partition 5 which acts as the bottom of the supply chamber. The supply chamber is closed by a porous tungsten member 6 and contains a tablet 7 of a mixture of barium aluminate and tungsten. The barium aluminate consists of 5 moles of BaO and 2 moles of Al$_2$O$_3$, to which may be added 3 moles of CaO. 20% by weight of this aluminate are mixed with 80% by weight of powdered tungsten. The mixture is pressed into tablets of the required size and fired in hydrogen at 1900° K.–2200° K. When the tablets 7 are arranged in the supply chambers, the tungsten members 6 are welded to the molybdenum members 4. The aluminate is produced by melting the alkaline earth carbonate used together with aluminum oxide in a hydrogen atmosphere. The composition of the aluminate is not critical and may include the compositions described in U.S. Patent 2,700,118 or U.S. application Serial No. 487,042, filed February 9, 1955.

The quartz tube 1 is surrounded by a coil 8 through which a high-frequency current can be passed for heating the crucible 3. In the method in accordance with the invention, the temperature is raised to 1900° K.– 2200° K. in a very short period of time.

Like Fig. 1, Fig. 2 also shows a quartz tube 1 through which hydrogen is passed. In this embodiment, the cathode member comprises a porous tungsten cylinder 10 which, at its upper end, is welded to a molybdenum cylinder 11 which is closed by a bottom 12 at the end adjacent the porous tungsten member. The other end of the porous tungsten member 10 is welded to a molybdenum cylinder 13 which extends to the other end of the tungsten member and there is provided with a bottom 14 which is slightly spaced away from the bottom 12 of the other molybdenum member. An amount 16 of a mixture of barium aluminate (and, as the case may be, calcium aluminate) and tungsten is pressed onto a part 15 of the molybdenum cylinder 13 of smaller diameter and is fired in hydrogen prior to the cathode being welded together. The ends of the cylinders 11 and 13 are embraced by clamps 17 and 18 for heating the cathode to a high temperature in hydrogen by the passage of current.

What is claimed is:

1. A method of making an improved dispenser cathode of the type comprising an internal cavity separated from the emitting surface by a porous member, comprising the steps of providing inside the cavity a mixture of barium-aluminate and tungsten and closing off the cavity with the porous member which is not in contact with the mixture, whereby there will be no absorption of the mixture by the porous body, thereafter heating the cathode to a temperature in the range of about 1900° K. to 2200° K. in a hydrogen-containing atmosphere for a short period of time not exceeding the order of one minute, and thereafter rapidly cooling the cathode.

2. A method as set forth in claim 1 wherein the mixture includes calcium oxide.

References Cited in the file of this patent
UNITED STATES PATENTS

| | | |
|---|---|---|
| 2,722,626 | Coppola et al. | Nov. 1, 1955 |
| 2,830,218 | Beggs | Apr. 8, 1958 |
| 2,869,017 | Levi | Jan. 13, 1959 |